United States Patent Office.

BARON W. LENK, OF VIENNA, AUSTRIA, ASSIGNOR TO NORMAN RAWSON AND CHARLES RICHMOND, OF DETROIT, MICHIGAN.

IMPROVED GUN-COTTON.

Specification forming part of Letters Patent No. 43,166, dated June 14, 1864.

*To all whom it may concern:*

Be it known that I, Baron W. LENK, of the city of Vienna, in the Empire of Austria, have invented a new and Improved Mode of Making an Explosive Material out of Cotton and other Vegetable Fibers; and I do hereby declare that the following statement is a full and accurate description of the articles used and the mode and manner of manufacturing the same into an article which is termed "Baron Lenk's improved gun-cotton."

1. The cotton or other vegetable fiber is first taken and spun into loose threads of sufficient strength to be easily handled.

2. The cotton must then be thoroughly boiled in a solution of potash or of soda in order to remove all greasy substances which the cotton may contain, and after thus boiled it may be exposed to the sun or wind, or in a heated room, to dry the same.

3. The cotton must now be taken into a room heated to 100° Fahrenheit, in order to make it perfectly dry.

4. A mixture is now made containing one part weight of nitric acid of 1.48 to 1.50 specific gravity, and three parts weight of common sulphuric acid. This mixture must stand in closed earthen or glass jars for several days, or until the two acids become fully mixed and cooled.

5. This mixture of acids is now put into an apparatus containing three apartments, one for the main bulk of the acids, one for the immersion of the cotton, and one for receiving the cotton after being so immersed. This apparatus may be made of cast-iron.

6. The cotton is now taken and dipped in the acid bath in said apparatus in such a manner that every three ounces of the cotton must come in contact with sixty pounds of the mixture of acids; or, in other words, the bath must contain fully sixty pounds of the mixture while parcels of three ounces of cotton are being dipped. The parcels thus dipped must be gently pressed and the acids allowed to flow back into the acid bath, and the parcels are then put into the third apartment of the apparatus, where for every one pound of cotton there must be ten and a half pounds of said mixture of the acids. The cotton must remain in this state to the action of the acids for forty-eight hours, and the mixture must always have an equally strong concentration, and must be kept under a uniform temperature by a cooling process.

7. The cotton is now taken out from the acids and pressed, and then put into a centrifugal machine to remove all surplus acids.

8. The cotton is again put into another centrifugal machine, into which a constant stream of fresh water is admitted. This process is intended to remove all the last particles of adhesive acids.

9. The cotton is now taken and put into a flume or trough and secured in such a manner that a running stream of fresh water may pass through and over it, and the same must remain in this situation for at least fourteen days. To lessen the time for this operation, the cotton may be immersed or saturated in alcohol for the space of twenty-four hours. This process is also intended to extract all and the last particles of acids that may possibly adhere to the cotton.

10. The cotton is now taken from the stream of water, or if from the alcohol, it must be washed and then boiled in a solution of common soap and again dried. This process is intended to restore the cotton to its original softness and appearance.

11. The cotton is now taken and immersed in a solution of water-glass of one pound to two pounds of soft water, and must be 1.09 specific gravity of concentration. To one pound of the cotton .198 of a pound of this solution of 36° Baumé is required. The cotton is then taken out of this solution and exposed to the action of the atmosphere for at least four days. This process has the tendency to preserve the material, and also to make its explosive qualities less rapid.

12. The gun-cotton is again washed in soft water free of lime, dried, and can then be packed in wood or metal boxes for storage or exportation, and may be used for artillery, torpedoes, shells, mining, blasting, small-arms, and for all purposes where explosive power is required.

13. All other vegetable fibers may be treated and manufactured as herein stated, which process will make the same explosive, like the gun-cotton, and adapted to the same purposes.

I claim as my invention—

An explosive improved gun-cotton made substantially as herein described.

City of Vienna, Austria, December 1, 1863.

BARON W. LENK.

Witnesses:
NORMAN RAWSON,
CHS. RICHMOND.